United States Patent [19]
Thylén et al.

[11] Patent Number: 4,658,224
[45] Date of Patent: Apr. 14, 1987

[54] METHOD AND APPARATUS FOR INCREASING THE BANDWIDTH OF A HIGH SPEED MODULATOR

[75] Inventors: Lars H. Thylén, Huddinge; Anders G. Djupsjöbacka, Solna, both of Sweden

[73] Assignee: Telefonaktiebolaget LM Ericsson, Stockholm, Sweden

[21] Appl. No.: 653,679

[22] Filed: Sep. 21, 1984

[30] Foreign Application Priority Data

Oct. 10, 1983 [SE] Sweden ............................ 8305572

[51] Int. Cl.$^4$ .............................................. G02B 5/14
[52] U.S. Cl. .................................. 332/7.51; 350/96.14; 350/356
[58] Field of Search ................ 332/7.51; 375/122; 350/96.11, 96.14, 356

[56] References Cited

U.S. PATENT DOCUMENTS

| | | |
|---|---|---|
| 3,393,954 | 7/1968 | Enderby et al. . |
| 4,005,927 | 2/1977 | Cator .................... 350/96.14 |
| 4,012,113 | 3/1977 | Kogelnik et al. . |
| 4,157,860 | 6/1979 | Marcatili . |
| 4,236,785 | 12/1980 | Papuchon et al. . |
| 4,262,993 | 4/1981 | Burns et al. ............ 350/96.14 |
| 4,291,939 | 9/1981 | Giallorenzi et al. . |

FOREIGN PATENT DOCUMENTS

| | | |
|---|---|---|
| CL3218626 | 7/1983 | Fed. Rep. of Germany . |
| A2109580 | 6/1983 | United Kingdom . |

OTHER PUBLICATIONS

Schmidt et al., "Coupled Wave Structures... and Modulators", 7/76, p. 80, Opt. Comm., vol. 18, #1.

Kogelnik et al., Switched Directional ... $\Delta\beta$", 7/76, pp. 396-401, IEEE J.Q.E., vol. QE-12, #7.

Marcatili; "Optical Subpicosecond Gate", 5/1/80, pp. 1468-1476, Appl. Opt., vol. 19, #9.

Applied Physics Letters, vol. 28, No. 9, issued May 1, 1976, R. V. Schmidt and H. Kogelnik, Electro-Optically Switched Coupler with Stepped $\Delta,\beta$ Reversal Using Ti-Diffused LiNbO$_3$ Waveguides, see pp. 503 to 506.

IEEE Journal of Quantum Electronics, vol. QE-17, No. 6, issued Jun. 1981, R. C. Alferness, Guide-Wage Devices for Optical Communication, see pp. 946 to 959.

IEEE Journal of Quantum Electronics, vol. QE-15, No. 12, issued Dec. 1979, P S Cross and R V Schmidt, A 1 Gbit/s Integrated Optical Modulator, see pp. 1415 to 1418.

IEEE Journal of Quantum Electronics, vol. QE-17, No. 4, issued Apr. 1981, P Thioulouse, A Carenco and R. Guglielmi, High Speed Modulation of an Electrooptic Directional Coupler, see pp. 535 to 541, especially Figure 3.

*Primary Examiner*—Nelson Moskowitz
*Attorney, Agent, or Firm*—Roberts, Spiecens & Cohen

[57] ABSTRACT

A method of increasing the available bandwidth of a high speed modulator in which an optical signal is modulated by a microwave signal (v) along an interaction distance (L). After passing half the interaction distance (L/2) the modulating signal is pole reversed by a positive (+E) and a negative (−E) bias voltage being connected to two different sections of the interaction distance. An apparatus according the method in an optical directional coupler modulator is described.

1 Claim, 11 Drawing Figures

METHOD AND APPARATUS FOR INCREASING THE BANDWIDTH OF A HIGH SPEED MODULATOR

TECHNICAL FIELD

The present invention relates to a method for increasing the bandwidth of a high speed modulator, in which modulation of a light signal with constant frequency is provided with the aid of an information-carrying microwave signal. The method and apparatus are however not limited to modulating with the aid of microwave signals, but should be primarily applicable to the utilization of such signals, since the bandwidth limitation is the greatest problem here.

BACKGROUND ART

The method in accordance with the present invention is intended for use in a modulator consisting of an integrated optical circuit known per se, which will be described more closely below in conjunction with FIGS. 1–4. Optical so-called directional couplers are already described in the literature (e.g. IEEE Journal of Quantum Electronics Vol. QE 17 No. 6, June 1981), these couplers include two optical conductors arranged in parallel over a so-called interaction distance, where an optical signal through one conductor can be coupled over to the other conductor along the interaction distance, and this coupling can be actuated by the action of a voltage of suitable magnitude. Such a directional coupler can be modified to constitute a high speed modulator, the voltage then being replaced with a modulating signal of very high frequency, e.g. a microwave signal. The microwave signal is taken parallel to the optical conductors, and for this there are customarily used transmission conductor electrodes, e.g. coplanar striplines.

DISCLOSURE OF INVENTION

In an optical high speed modulator according to the above, the light in the wave-guiding channels runs parallel to the microwave signals in both transmission conductor electrodes, but with different propagation rates. This difference in the propagation rate between the microwave and the light in the channels limits the bandwidth of the optical circuit such that the greater the difference in the propagation rate the greater will be the difference in accumulated phase difference between the microwave and light after a given distance, and the less will be the bandwidth. It is therefore advantageous to keep the interaction distance as small as possible to reduce the phase difference between optical signal and microwave signal which occurs due to the difference in propagation rate. At the same time, with regard to driving power, i.e. the microwave power needed for the modulation, it is desirable to use as long an interaction distance as possible, and thereby long transmission conductors.

In accordance with the above, the difference in propagation rates lead to a relative phase shift between microwave and light signal, and when this phase shift is 180° and greater there is a deterioration of the modulation properties in continued coupling over the rest of the interaction distance, i.e. bandwidth limitation. Reduction of the interaction distance for counteracting such deterioration results, according to the above, in that the driving power must be increased.

An object of the present invention is to reduce the effect of the phase shift occuring between a modulating microwave signal (with generally low propagation rate) and a modulated optical signal with a greater propagation rate than the microwave signal while retaining a sufficiently long interaction distance, i.e. increasing the bandwidth for retained driving power, or reducing the driving power for retained bandwidth.

In accordance with the inventive method, a pole reversal of the modulating signal takes place after the modulating signal has been phase-shifted 180° relative the optical signal, due to the difference in the propagation rate. There is thus obtained an alteration of the modulating signal such that in spite of the interaction distance corresponding to a $2\pi$ phase difference it can give a modulation of the optical signal.

BRIEF DESCRIPTION OF DRAWINGS

The invention will now be described in detail with reference to the accompanying drawing, where.

BEST MODES FOR CARRYING OUT THE INVENTION

Figure 1:
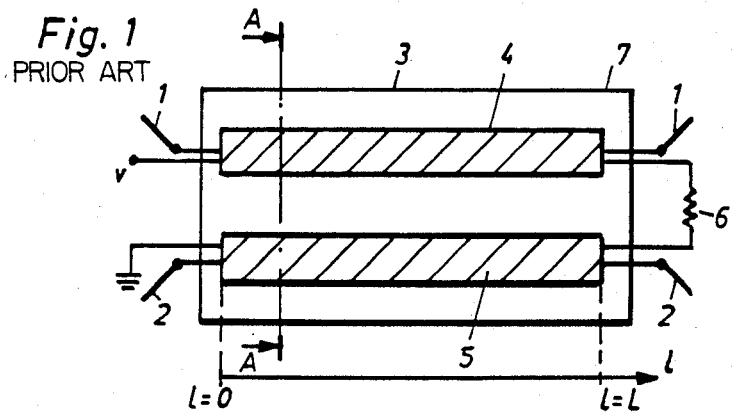
FIG. 1 illustrates a high speed modulator in the form of an integrated optical circuit of a known embodiment.

FIG. 1 illustrates a high speed modulator consisting of a so-called optical directional coupler with a pair of identical and planar wave guides, or so-called strip lines 4 and 5, which take a modulating microwave signal modulating an incoming light signal through the optical wave conductor 1, e.g. from a laser diode. Both light conductors 1 and 2 in the modulator are placed so close to each other that light fed in, e.g. through the conductor 1 along the distance 0-L, can be coupled over to the conductor 2. The planar wave guides 4 and 5 are connected to each other via a loading resistor 6. The length L of each wave guide 4,5 is the so-called interaction distance.

A microwave signal v is supplied to the input of the conductor 4. This signal v is assumed to be sinusoidal, and during its propagation along the interaction distance L it will actuate the coupling of the light between both light conductors 1 and 2, the light signal being obtainable at the output of the conductor 2, thus enabling modulation.

Figure 2:
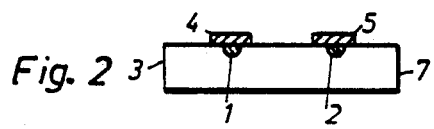
FIG. 2 is a cross-section of the circuit according to FIG. 1, FIGS. 3 and 4 are diagrams of the light energy distribution in the circuit according to FIG. 1.

FIG. 2 is a cross-section of the circuit according to FIG. 1, along the section A—A. On a substrate 7 of lithium niobate ($LiNO_3$) the two light conductors 1 and 2 with a higher refractive index than the lithium niobate have been created with the aid of Ti-diffusion. Both wave conductors 4 and 5 are disposed on top of the planar upper surface in the form of strip-lines (of aluminium).

Figure 3:
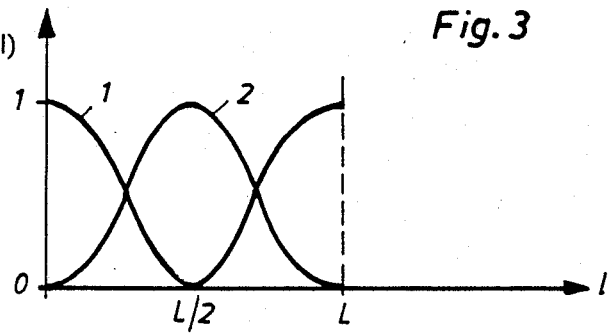

If it is assumed in FIG. 1 the signal v is a pure direct voltage (f=0, v=V$_o$) a distribution of the light energy through the conductors 1, 2 (illustrated in FIGS. 3, 4) is obtained at a given instant. FIG. 3 illustrates the case: v=V$_o$=0 and it will be seen that this fibre conducts all the light at the beginning of the interaction distance 1=0, i.e. at the input to the light conductor 1. During the interval 0<1<L/2 coupling over of light from the light conductor 1 to light conductor 2 takes place so that for 1=L/2 the light conductor 2 conducts all the light. During the interval L/2<1<L the light from conductor 2 will be coupled over to conductor 1 in a similar way. There is thus obtained an alternating transfer of light from one light conductor to the other along the interaction distance 0-L.

Figure 4:
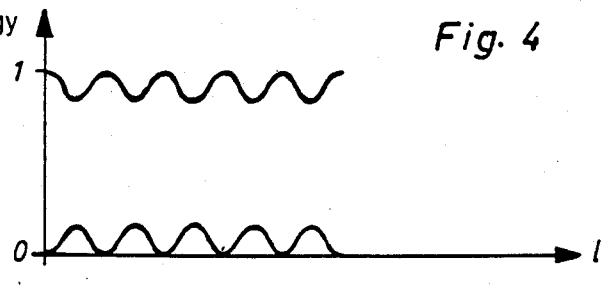

If a direct voltage is applied across the waveguide 4,5 it will actuate the coupling between the light conductors 1 and 2 so that for a given voltage v=V$_o$=0 there is no coupling over between the conductors, and the light strength (or energy) will only vary weakly according to FIG. 4.

From the above it will thus be seen that light obtained at the output, e.g. of light conductor 1, can be modulated by a modulating voltage v at the input to the light conductors 1, 2 according to FIG. 1. In the case where this signal constitutes a microwave signal, the wavelength $\lambda_m$>>L no problems occur with such modulation of the light.

When however, the frequency of the microwave signal in high speed modulation is increased so that the phase difference between light and the microwave signal approaches $2\pi$ over the interaction distance L, problems arise in obtaining modulation, since any positive (or negative) contribution corresponding to the voltage V$_o$(−V$_o$) and affording modulation cannot be obtained. This is due to that, for a whole period of the phase difference between the microwave signal v and the light, the positive and negative half-waves inhibit each other and the modulating action disappears. This signifies a bandwidth limitation of the modulators of the type illustrated in FIG. 1.

Figure 5:
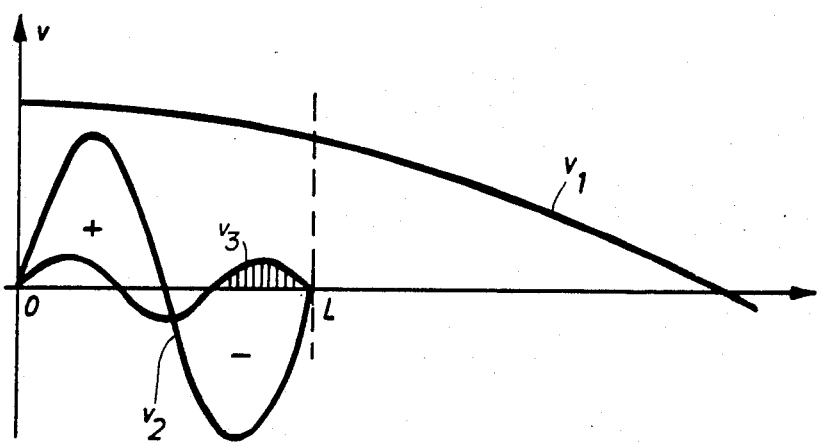
FIG. 5 is a diagram of modulating microwave signals occuring in the circuit according to FIG. 1.

The intention with FIG. 5 is to more closely illustrate the above-mentioned problems with the bandwidth limitation. The diagram in FIG. 5 illustrates 3 different microwave signals v$_1$, v$_2$, v$_3$ with different frequencies. The signal v$_1$ with the lowest frequency has a wavelength $\lambda_1$ which is greater in the figure (very much greater in reality) than the interaction distance L. This signal obviously gives a positive contribution for every phase position 0°-360° within the interaction distance and there is thus obtained proper modulation according to FIG. 1. The signal v$_2$ has such a high frequency that the difference in propagation time along the distance L corresponds to a microwave period Tm, which means that no resulting alteration within the interaction distance L takes place. This applies to every phase position of the microwave. Thus no proper modulation is obtained.

If the frequency of the microwave signal is further increased to give the signal v$_3$, this does indeed give a net addition (hatched surface in FIG. 5). In practice, this addition is however too insignificant to obtain modulation, and thereby an increase in the bandwidth.

A method is given in accordance with the invention for increasing the bandwidth of a high speed modulator of the kind illustrated in FIG. 1 by altering the modulating signal during interaction distance, so that effective modulation is provided for microwave signals also, the frequency of these signals being so high that the difference in the propagation time over the distance L corresponds to a microwave period according to the above. This alteration can be provided, e.g. by a pole reversal of the signal after half the interaction distance so that the signal will be rectified after poll reversal (indicated in FIG. 5 by hatching for v$_2$), thus enabling the necessary net addition.

Figure 6:
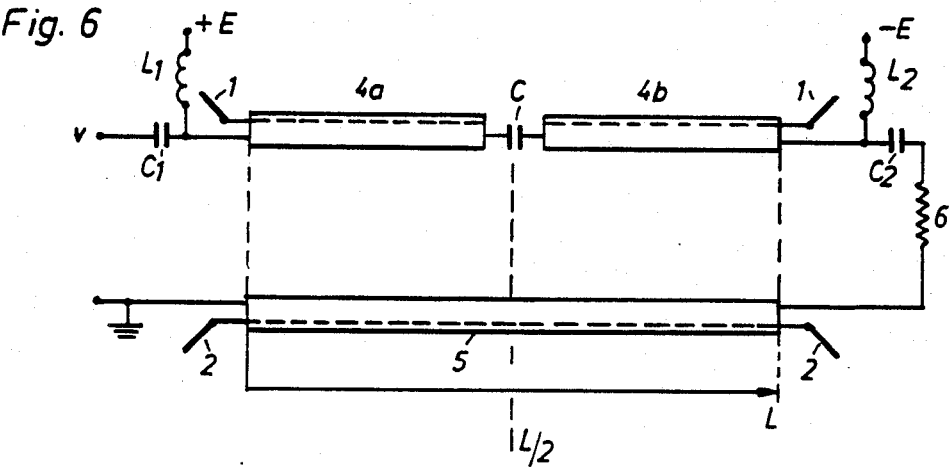
FIG. 6 is a circuit diagram of an electrode structure in a directional coupler modulator using the method in accordance with the invention.

FIG. 6 illustrates an optical directional coupler modulator of the same kind as in FIG. 1, but modified according to the inventive method. The microwave input is connected via a capacitor C$_1$ to the planar wave conductor, which has been divided into two parts 4a and 4b in this case, these parts being connected to each other via a capacitor C. A positive direct voltage +E is connected via an inductance L$_1$ between the capacitor C$_1$ and the input to the wave conductor part 4a. The parts 4a, 4b are planar strip lines as in the circuit according to FIG. 1. The output of the wave conductor part 4b is connected to the output of the wave conductor 5 via a capacitor C$_2$ and a load 6, the wave conductor 5 being of the same implementation as the corresponding wave conductor in FIG. 1. A negative direct voltage −E is connected via an inductance L$_2$ to the output of the wave guide part 4b and the input to the wave guide 5 is grounded. As with the circuit according to FIG. 1, the optical wave conductors 1 and 2 are parallel to the wave guide parts 4a, 4b and the wave guide 5, respectively with the aid of both voltages +E and −E, the circuit according to FIG. 5 has been biassed positively and negatively relative to ground, whereby a pole reversal of an incoming microwave signal has been provided after half the interaction distance.

The FIGS. 7-10 illustrate the microwave voltage distribution along the interaction distance for four phase positions relative to the light, i.e. at two different instants. FIGS. 7a-10a illustrate the distribution of the bias voltages +E, −E, FIGS. 7b-10b the distribution of the microwave (if no bias is used) and FIGS. 7c-10c the total voltage distribution for the different phase positions 0°, 90°, 180° and 270°.

When the phase shift is 0° (FIGS. 7a-c) the contribution from the bias voltages +E and −E will co-act with the microwave signal, and when the phase shift has become 180° (FIGS. 9a-c) the direct voltage contribution will act against the microwave signal. Co-action takes place for both phase shifts 90° and 270° during a half-period and counteraction during the next half-period, which cancel each other. The areas under the respective graphs according to FIGS. 7c-10c will thus vary from a maximum value (at 0° phase shift) to a minimum value (at 180° phase shift). This variation in the areas gives the desired modulation of the optical signal.

Computer simulations for the above integrated optical directional coupler have shown that the new electrode structure is given a bandpass character, and that its bandwidth increases approximately twice as much as compared with the known electrode structure according to FIG. 1 with the same physical length (L). The optical modulation declines somewhat in the actual case with the new electrode structure. This means the electrical modulation effect must be increased correspondingly if the optical modulation out from the directional coupler is to be kept constant.

Figure 11:
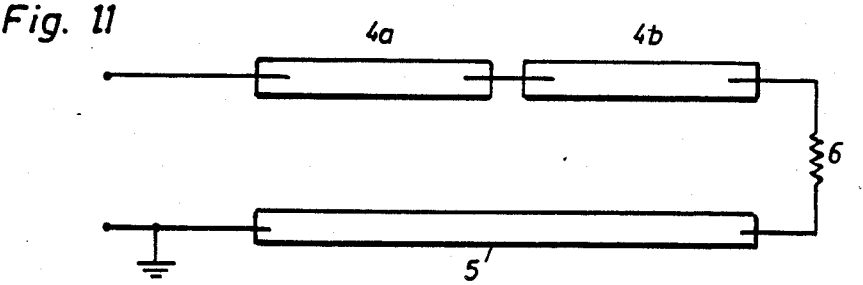
FIG. 11 shows an electrode structure in another embodiment of the invention.
Figure 7:
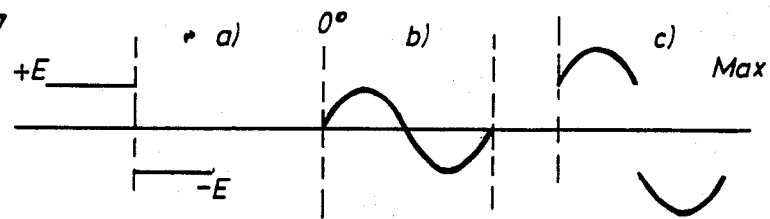
FIGS. 7–10 are diagrams of the voltage distribution along the electrodes in the modulator according to FIG. 6.
Figure 8:
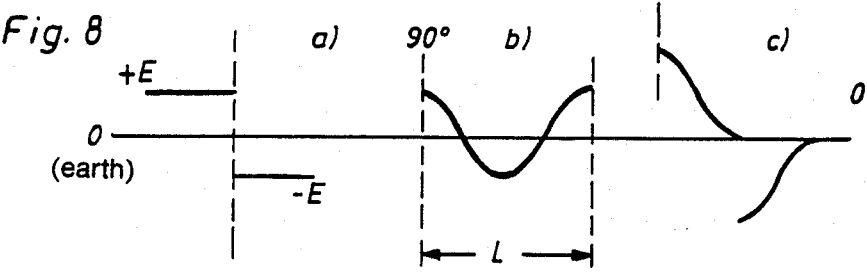
Figure 9:
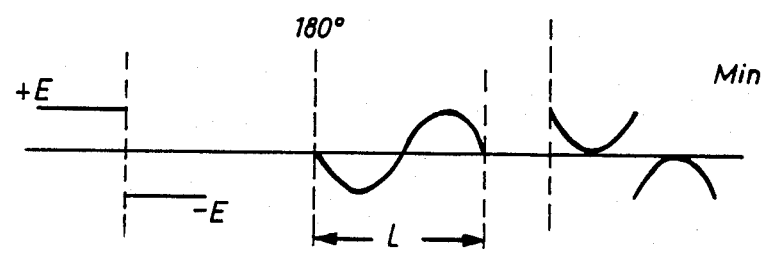
Figure 10:
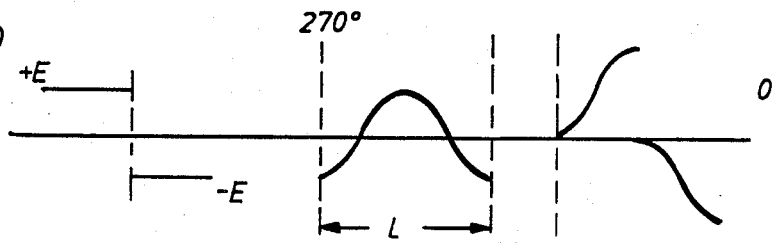

An alteration of the microwave energy along the interaction distance which gives rise to modulation of the light signals can also be achieved without using bias voltages, i.e. when E=0 in the FIGS. 7-10. FIG. 11 illustrates the electrodes structure for such a modulator, where the same reference characters have been retained as for FIG. 6.

We claim:

1. Wide-band high-speed modulator of the traveling wave type comprising: a substrate; two parallel planar wave conductor means disposed on said substrate, one of said conductor means being a continuous metallic conductor, the other of said conductor means being two distinct metallic conductors in axially aligned relationship; coupling means for AC coupling but DC isolating said two distinct metallic conductors; means for applying a positive bias voltage to a first of said distinct metallic conductors; means for applying a negative bias voltage to a second of said two distinct metallic conductors; load means for connecting the end of one of said two distinct metallic conductors remote from said coupling means to the end of said continuous metallic conductor adjacent thereto; means for applying a microwave signal across the end of the other of said metallic conductors remote from said coupling means and the end of said continuous metallic conductor adjacent thereto; a first optical conductor disposed adjacent and parallel to one of said conductor means for guiding an optical signal; and a second optical conductor disposed adjacent and parallel to the other of said conductor means for guiding an optical signal.

* * * * *